H. WISE.
AUTOMOBILE BED.
APPLICATION FILED AUG. 17, 1920.

1,371,830.

Patented Mar. 15, 1921.
2 SHEETS—SHEET 1.

Witness
W. C. Fielding.

Inventor
Harry Wise
By Norman D. Whitaker
Attorney

H. WISE.
AUTOMOBILE BED.
APPLICATION FILED AUG. 17, 1920.
1,371,830.
Patented Mar. 15, 1921.
2 SHEETS—SHEET 2.
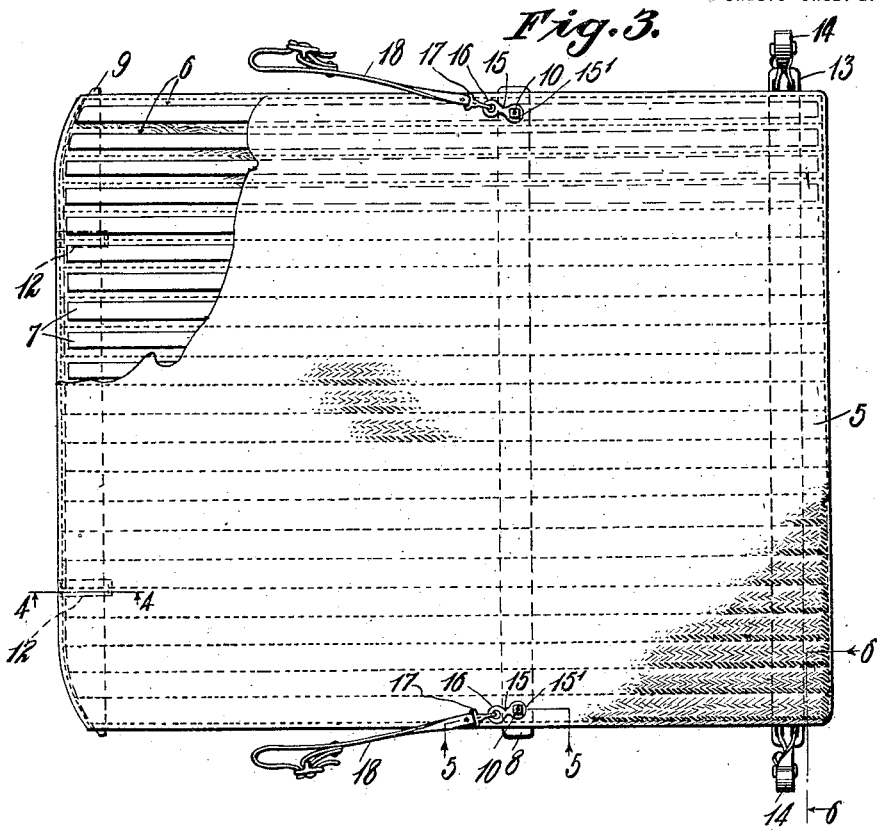
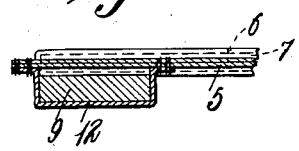
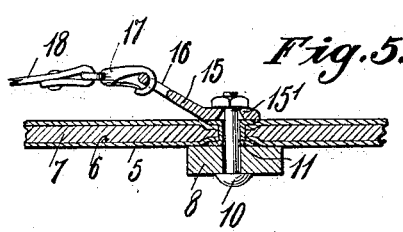
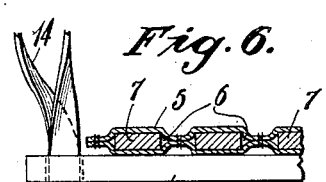
Witness
W. C. Fielding
Inventor
Harry Wise
By Norman J. Whitaker
his Attorney

UNITED STATES PATENT OFFICE.

HARRY WISE, OF YAKIMA, WASHINGTON.

AUTOMOBILE-BED.

1,371,830.  Specification of Letters Patent.  Patented Mar. 15, 1921.

Application filed August 17, 1920. Serial No. 404,142.

*To all whom it may concern:*

Be it known that I, HARRY WISE, a citizen of the United States, and a resident of Yakima, in the county of Yakima and State of Washington, have invented a new and useful Automobile-Bed, of which the following is a specification.

The present invention is an automobile bed and has as its all important object the provision of a bed that may be readily supported in an automobile and which can be readily folded and arranged at one side of the automobile when not in use.

Further, the invention provides an automobile bed suitable for tourists which includes a flexible mattress or support that can be rolled up when not in use and which, when extended and arranged in operative position, will be supported rigidly to permit a person to recline thereon with comfort.

The invention also provides a bed readily applicable to any type of automobile and which is of comparatively simple and durable construction.

With the preceding and other objects and advantages in mind as will become apparent from the following disclosures, the invention consists of the novel combination of elements, constructions and arrangement of parts and operations to be hereinafter set forth, claimed and illustrated in the accompanying drawings, wherein:

Fig. 3 is a plan view of the bed in extended position, parts being broken away;

Fig. 4 is a fragmentary sectional view taken on line 4—4 of Fig. 3;

Fig. 5 is a similar view taken on line 5—5 of Fig. 3; and

Fig. 6 is a fragmentary transverse sectional view taken on line 6—6 of Fig. 3.

Figure 2:
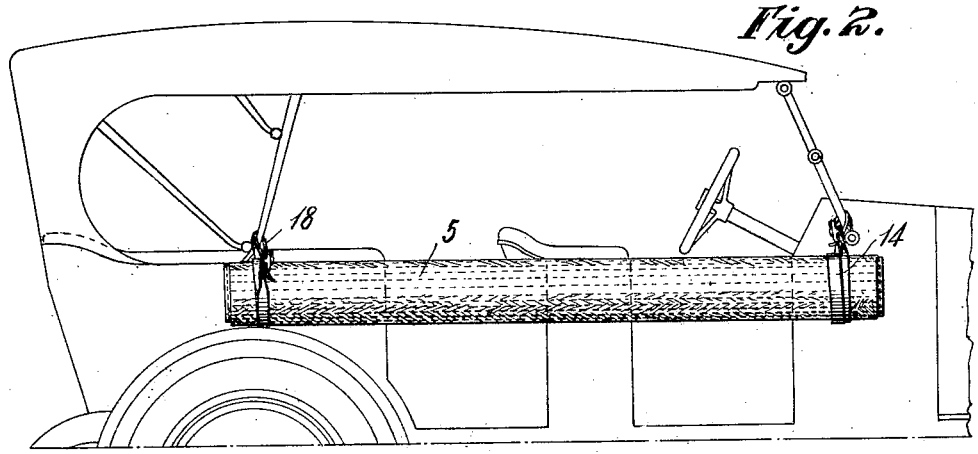
Fig. 2 is a similar view showing the bed folded and supported at one side of the automobile.

Referring in detail to the drawing wherein like characters of reference designate similar parts throughout the several views, the numeral 5 designates a fabric covering or casing stitched longitudinally at spaced intervals to provide longitudinal pockets 6 and arranged in each of these pockets 6 is a bar or slat 7. The flexible covering 6 and the slats 7 constitute the bed proper which, as will be obvious from the drawing, may be rolled into compact form and supported on one side of the autmobile as shown in Fig. 2.

Figure 1:
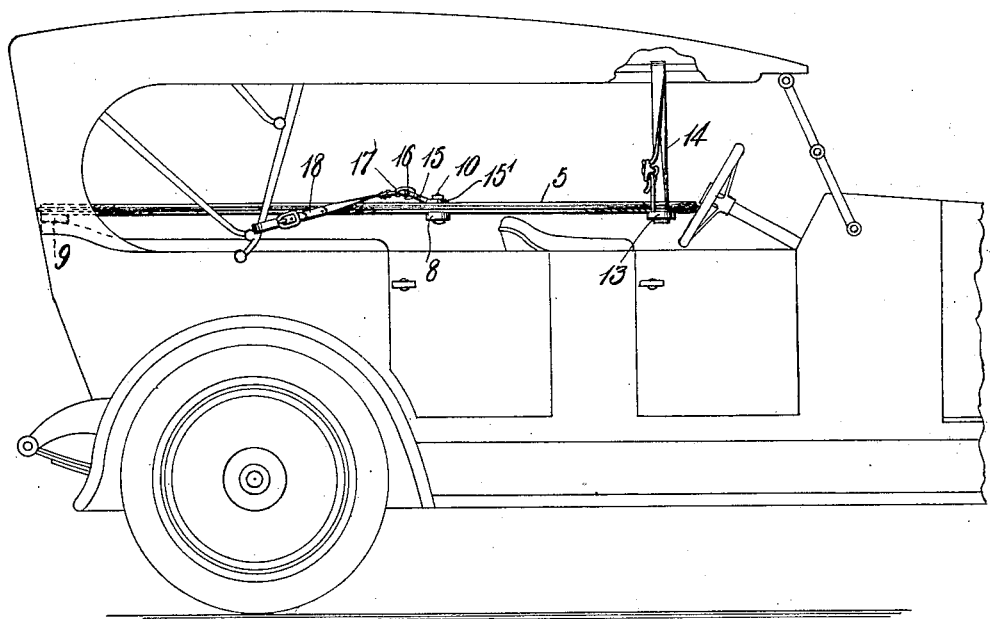
Figure 1 is a fragmentary side elevation of an automibile equipped with my improved bed.

The bed is adapted to be supported to the automobile, as shown in Fig. 1, and in order to retain the bed from flexing there is provided bars 8 and 9 arranged transversely beneath the bed 5, the former being arranged in the approximate center of the bed and secured thereto by bolts 10 passing through eyelets 11 adjacent the longitudinal edges of the bed. The bar 9 is received in U-shaped guides or yokes 12 secured to the under face of the bed at one of its transverse edges and is adapted to rest upon the upper edge of the rear seat of the automobile.

A supporting bar 13 is arranged beneath the forward edge of the bed and secured to this bar at its ends is a pair of straps 14 which pass around the side bars of the top of the automobile to support the forward end of the bed.

Upwardly and angularly disposed castings 15 are arranged at the opposite longitudinal edges of the bed 5 and are provided with laterally disposed eyes 15' at one end receiving the bolts 10. The opposite ends of these castings are also provided with eyes 16 with which snap hooks 17 carried by straps 18 are detachably engaged and prevent the bed from moving longitudinally.

It is to be understood that the form of my invention herein shown and described is to be taken as a preferred example of the same, and that various changes in the shape, size and arrangement of parts may be resorted to without departing from the spirit of the invention or the scope of the subjoined claims.

Having thus described my invention, what I claim as new and useful and desire to secure and protect by Letters Patent of the United States, is:—

1. In an automobile bed, a fabric covering provided with a plurality of spaced longitudinal pockets, slats arranged in the pockets, a bar secured to the under face of the covering extending transversely thereof, angularly disposed castings secured to the upper face of the covering and disposed in transverse alinement at the opposite edges thereof, a pair of straps adapted to be connected with the frame of the top of an automobile, detachable fastenings carried thereby for engagement with the castings, a bar arranged beneath the rear end of the covering and detachably secured thereto and adapted to rest upon the upper edge of the rear seat of the automobile, and a supported horizontally disposed bar arranged beneath the forward end of the covering to support the same.

2. In an automobile bed, a fabric covering provided with a plurality of spaced longitudinal pockets, slats arranged in the pockets, a bar secured to the under face of the covering extending transversely thereof, angularly disposed castings secured to the upper face of the covering and disposed in transverse alinement at the opposite edges thereof, a pair of straps adapted to be connected with the frame of the top of an automobile, detachable fastenings carried thereby for engagement with the castings, a bar arranged beneath the rear end of the covering and detachably secured thereto and adapted to rest upon the upper edge of the rear seat of the automobile, straps suspended from the top of the automobile and disposed at the longitudinal edges and adjacent the forward end of the covering, and a supporting bar arranged beneath said forward end and suspended from the straps.

3. A bed comprising a flexible body capable of being rolled upon itself when not in use and adapted to be arranged longitudinally within an automobile above the seats thereof, a plurality of yokes secured to the under face of the body, a bar disposed transversely of the body and engaged in the yokes, a second bar arranged transversely of the body at its approximate center, removable fastenings extending through the ends of the bar and through the body, angularly disposed elements formed with eyes at its opposite ends, one of which of each element receiving one of the fastenings and held in place thereby, and flexible elements detachably secured to the side frame of the top of the automobile and carrying fastening elements having detachable engagement with the other of the eyes of the first mentioned elements.

HARRY WISE.